(12) United States Patent
Kramer et al.

(10) Patent No.: US 7,206,437 B2
(45) Date of Patent: Apr. 17, 2007

(54) METHOD TO CONDUCT FINGERPRINT VERIFICATION AND A FINGERPRINT VERIFICATION SYSTEM

(75) Inventors: Hans Walter Kramer, Belp (CH); Lorenz Müller, Biel (CH)

(73) Assignee: Berner Fachhochschule Hochschule fur Technik und Architektur Biel, Biel (CH)

( * ) Notice: Subject to any disclaimer, the term of this patent is extended or adjusted under 35 U.S.C. 154(b) by 0 days.

(21) Appl. No.: 10/964,358

(22) Filed: Oct. 13, 2004

(65) Prior Publication Data

US 2005/0084143 A1  Apr. 21, 2005

(30) Foreign Application Priority Data

Oct. 17, 2003  (EP) ................... 03405747

(51) Int. Cl.
*G06K 9/00* (2006.01)
(52) U.S. Cl. ...................... 382/125; 382/170
(58) Field of Classification Search ...................... None
See application file for complete search history.

(56) References Cited

U.S. PATENT DOCUMENTS

| | | | | |
|---|---|---|---|---|
| 3,959,884 A | * | 6/1976 | Jordan et al. ............... | 283/69 |
| 4,135,147 A | | 1/1979 | Riganati et al. | |
| 4,151,512 A | * | 4/1979 | Riganati et al. ............ | 382/125 |
| 4,185,270 A | * | 1/1980 | Fischer II et al. .......... | 382/125 |
| 5,613,014 A | * | 3/1997 | Eshera et al. ............... | 382/124 |
| 5,631,971 A | | 5/1997 | Sparrow | |
| 5,631,972 A | | 5/1997 | Ferris et al. | |
| 5,960,101 A | | 9/1999 | Lo et al. | |
| 6,002,784 A | * | 12/1999 | Sato ............................ | 382/124 |
| 6,681,034 B1 | * | 1/2004 | Russo ......................... | 382/125 |
| 6,778,687 B2 | * | 8/2004 | Sanders et al. ............. | 382/125 |
| 2001/0040989 A1 | | 11/2001 | Kovacs-Vajna | |
| 2003/0039381 A1 | | 2/2003 | Ziesig | |
| 2003/0169910 A1 | * | 9/2003 | Reisman et al. ............ | 382/124 |
| 2004/0125993 A1 | * | 7/2004 | Zhao et al. ................. | 382/124 |

FOREIGN PATENT DOCUMENTS

EP  0 715 275 A2  6/1996

OTHER PUBLICATIONS

Feri Pernus, Stanko Kovacic, and Ludvik Gyergyek; "Minute Based Fingerprint Registration"; IEEE; pp. 1380-1382; (1980).
"Microsystems For Biometrics"; published by Technologies AG, CC Applications Group; 38 pages; (2000).

(Continued)

*Primary Examiner*—Wenpeng Chen
(74) *Attorney, Agent, or Firm*—The Webb Law Firm

(57) ABSTRACT

A method to conduct fingerprint verification provides a sector distribution based on the position and angle of every minutiae vector, wherein the number of further minutiae vectors of the template in any sector of the sector distribution is determined and a feature vector is generated for every minutiae vector of both templates. The two feature arrays are matched by calculating the scalar product for every combination of said vectors generating a matrix. Mated pairs of minutiae from the first second template are found by searching the maximum element in every column of the matrix finally issuing a value representing identification information of the fingerprint. Additionally a false finger identification method and a fingerprint verification system are disclosed.

19 Claims, 3 Drawing Sheets

OTHER PUBLICATIONS

Tsutomu Matsumoto; "Gummy And Conductive Silicone Rubber Fingers-Importance of Vulnerability Analysis"; Springer-Verlag Berlin Heidelberg; pp. 574-575; (2002).

Michael D. Garris, Craig I. Watson, R. Michael McCabe and Charles L. Wilson; "User's Guide To NIST Fingerprint Image Software"; 4 pages (Sep. 15, 2004).

* cited by examiner

METHOD TO CONDUCT FINGERPRINT VERIFICATION AND A FINGERPRINT VERIFICATION SYSTEM

BACKGROUND OF THE INVENTION

1. Field of the Invention

The invention relates to a method to conduct fingerprint verification and a fingerprint verification system.

2. Description of the Related Art

The prior art discloses some different approaches to improve fingerprint verification systems with the goal to decrease the false acceptance rate in cases of fraud. One approach to fool known fingerprint verification systems consists to present them artificial fingers as described in Matsumoto et al. "Impact of artificial 'gummy' fingers on fingerprint systems" in Optical Security and Counterfeit Deterrence Techniques IV, Bellingham, Wash., 2002-01-23/25, Vol. 4677, The International Society of Optical Engineering, pages 275/288.

Fingerprint recognition systems have been widely used in forensic applications. Originally, conventional technology was used with inked fingerprint dab and paper card based databases, wherein human experts conducted retrieval and matching. Since some years electronic and computer software based databases and screening methods had been developed and put into practice.

More recently, with the increased availability of fingerprint scanning devices, fingerprint technology has become one of the most important biometric identification methods. However, as every chain link in a security system, electronic fingerprint recognition systems are a possible target of unlawful attack and fraud.

SUMMARY OF THE INVENTION

It is in object of the invention to provide an improved fingerprint verification system, which is capable of returning detailed matching information including precise registration of the template and the query fingerprint scan image.

Additionally it is an object of the invention to provide a method and apparatus to detect the use of artificial fingers, e.g. above mentioned gummy fingers. It is a further object of the invention to provide a fingerprint verification system being able to discriminate between genuine and artificial fingerprints.

The matcher architecture uses a two stage matching, i.e. first a topological matching followed by a geometrical matching. This concept proved to be very efficient and transparent. One major advantage of the method according to the invention is that the results returned by the matching process allows for a precise registration template and query images.

Such a precise registration is important for a further filter stage comparing the overall quality of the scans to detect the use of artificial fingers within the query process. It is clear that such subtle comparison can only be performed in image segments that can safely be matched.

Further advantageous embodiments are characterized through the features mentioned in the dependent claims.

Throughout this disclosure the following definitions shall be used.

Fingerprint recognition is a general term for fingerprint identification as well as verification.

While fingerprint identification refers to the process of matching a query fingerprint against a template fingerprint database to establish the identity of an individual, fingerprint verification refers to determination of whether two fingerprints are from the same finger or not. Since verification is a comparison of a query fingerprint against an enrolled template fingerprint, it is also termed as one-to-one matching. Identification, on the other hand, is termed as one-to-many matching.

A fingerprint scan is a digital representation of a fingerprint as a result of a data acquisition process with a fingerprint-scanning device. In this work the typical data format of a raw fingerprint scan is the bit-mapped (BMP)-image file format, but there are multiple other valid formats.

A live finger is a genuine finger, forming part of the living body of a person whose identity should be verified. A gummy finger or an artificial finger is not genuine. It is artificially produced and used to deceive fingerprint systems.

From a fingerprint scan, an extraction process locates features in the ridges and furrows of the friction skin, called minutiae. Points are detected where ridges end or split, and their location, type, orientation and quality are stored and used for search.

There are 30 to 50 minutiae on a typical sensor scan, and matching takes place on these points rather than on all the pixels in the fingerprint image. With the above-mentioned sensor from Infineon the fingerprint image comprises 288 times 224=64'512 pixels which results in a pixel size of approx. 0.05 mm typical for such sensors.

Image registration is the process of aligning two or more images of the same scene. One image, called the base image, is considered the reference to which the other images, called input images, are compared. The object of image registration is to bring the input image into alignment with the base image by applying a spatial transformation to the input image.

BRIEF DESCRIPTION OF THE DRAWINGS

The invention is now described by way of example on the basis of the accompanying drawings.

DESCRIPTION OF THE PREFERRED EMBODIMENTS

Figure 1:
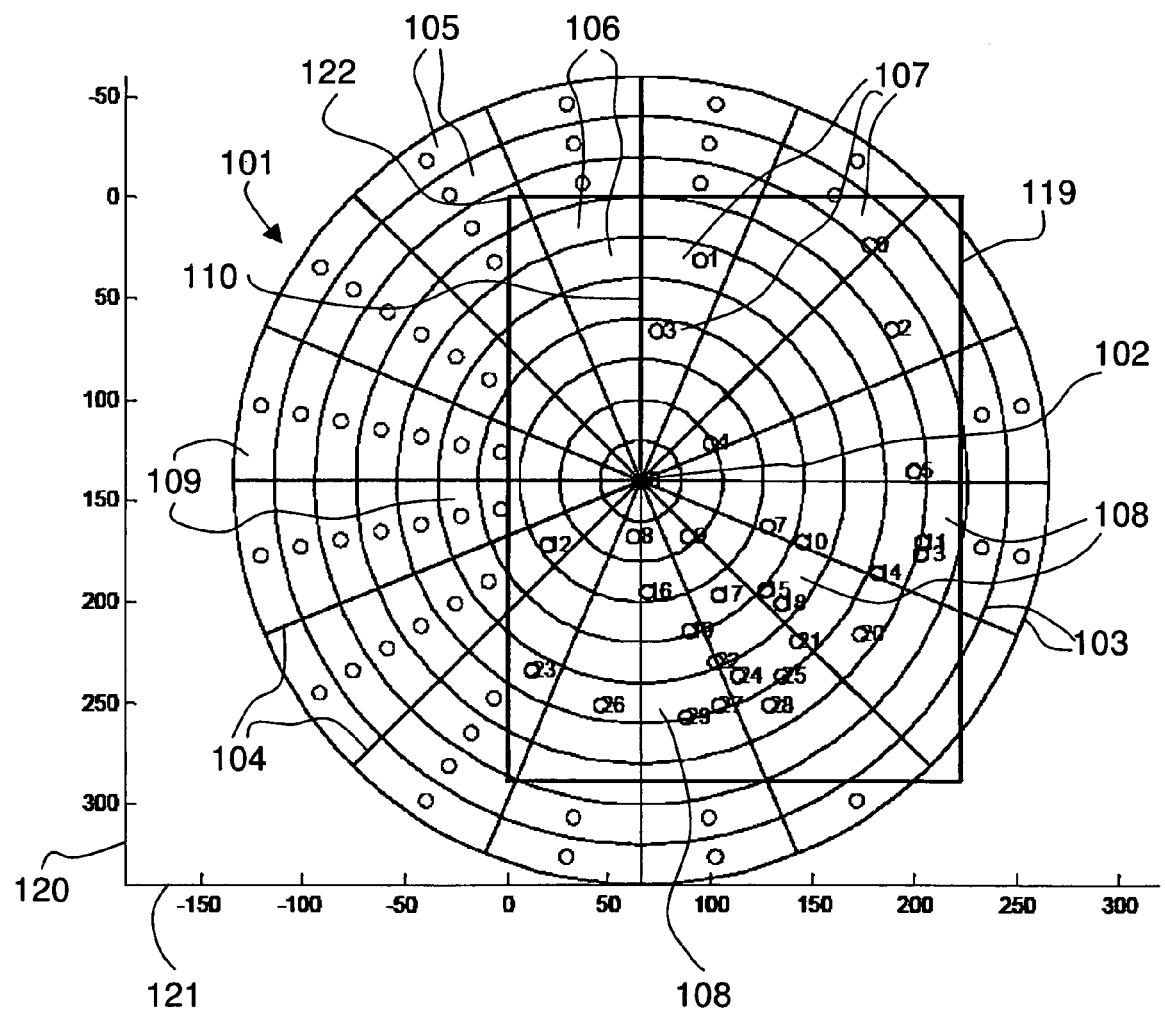
FIG. 1 shows a target constructed around a minutiae point according to a first embodiment of the invention.

A method for an automatic fingerprint identification and/or verification system comprises at least three main processing stages namely, a.) fingerprint scanning b.) feature extraction, e.g. fingerprint minutiae extraction, and c.) matching.

The following description briefly explains the necessary steps relating to steps a.) and b.) before describing in depth step c.) with reference to the enclosed drawings.

The invention may be used with any conventional fingerprint scanning method, i.e. the aim of the scanning method is the creation of fingerprint images. Typical fingerprint scanning systems are disclosed in the above-mentioned paper of Matsumoto et al. A capacitive fingerprint sensor as used within the embodiments of the apparatus according to the invention is disclosed in "Microsystems for Biometrics FingerTIP-FTF 1100 MF1 V2.0 CMOS Chip and System Data Book 3.3", Munich, Germany, 2000, Status 05.00, Infineon Technologies AG, CC Applications Group, 38 pp. Such a system can be used to provide images, e.g. so-called BMP images with a given gray level palette.

There are several different approaches to conduct feature extraction, e.g. fingerprint minutiae extraction. One excellent description of feature extraction technology can be found in Garris et al. "Users's Guide to NIST Fingerprint Image Software (NFIS)", Gaithersburg, Md., USA, 2001-04, National Institute of Standards and Technology, 186 pp. Said authors have published a software package for fingerprint feature extraction, the so-called NIST/NFIS software, which can be directly used on the above mentioned stored fingerprint images to extract minutiae.

In contrast to the standardized minutiae feature extraction, minutiae feature matching technology has been developed in different directions. Examples of prior art are the U.S. patents of Ferris-Powers U.S. Pat. No. 5,631,972, Kovacs-Vajna US 2001/0040989, Lo-Bavarian U.S. Pat. No. 5,960,101, Riganati et al. U.S. Pat. No. 4,135,147 and Sparrow U.S. Pat. No. 5,631,971.

The following description provides a different solution for the problems related to minutiae feature matching.

Fingerprint scans are subjected to translation, rotation and distortion. It is up to the apparatus and method according to this invention to provide a better solution than correlation or convolution pattern matching methods known from prior art. Usually fingerprint recognition uses the singularity points of a fingerprint, the so-called core and delta features. However, the use of these features is not always easy or possible. Solid-state sensor scans may only capture a fraction of the fingerprint area. The core/delta-based recognition does not cope with fingerprint distortion.

As mentioned the available fingerprint minutiae point pattern may be subjected to translation, rotation and distortion, just depending on how exactly the fingertip is actually positioned on and pressed against the scanning device. Also, because of missing or additional minutiae in either point sets (called query and template), a complete matching of all minutiae is generally not possible.

Fingerprint minutiae have additional point attribute information as minutiae type (ridge end or bifurcation) and minutiae direction facilitating the matching. The relative directional orientation and the relative position of neighboring minutiae are almost invariant to translation, rotation and—in some extent—distortion.

The method used for verification is based on the insight that only corresponding pairs of template-minutiae and query-minutiae have to be matched. This mating will be achieved by matching of the local environment of the minutiae.

The result set is consistency checked in order to minimize the probability of falsely matched minutiae pairs.

The results will then be used to register the query and the template image, which in turn will then be used for an iterative geometrical matching of minutiae pairs. Finally, the matcher step returns a set of mated minutiae pairs.

In order to detect the use of a gummy finger a subsequent filter stage evaluates the low pass filtered gray level intensity of the query compared to the template.

The embodiment according to the invention uses live fingerprint data form a fingertip sensor providing an image of 224 times 288 pixels with 8 bit-grayscale and a resolution of 513 dpi.

The scan of the template had been saved as BMP image beforehand but also a transformed format could be used.

The scan of the query is a second raw fingerprint scan and provided as BMP image.

Both images are submitted to the NIST/NFIS-mindtct-package from the above-mentioned authors Garris, Watson, McCabe and Wilson providing a binarized image, minutiae feature data and minutiae quality information. All minutiae are represented with the three values pixel coordinates, direction and quality. The pixel coordinates are given in x and y coordinates, although different representation systems may be used. One pixel of a binarized image according to this embodiment comprises only the values black or white, gray values are not used.

The method according to this invention comprises two stages:

a topological matcher a geometrical matcher.

The topological matcher compares the local environment of template and query minutiae. This allows finding the relative position of template and query images replacing the less efficient core/delta-method used within prior art. The result is a set of mated template-query minutiae pairs. The topological matcher function returns the necessary parameters for the subsequent image registration by the geometrical matcher.

The topological matcher starts with the data of the query minutiae represented in FIG. 1 with an overlaid target structure 101. Every vector of the query minutiae comprises at least a position indication and an angle indication. The position indication 102 may be the center pixel position of the minutiae in the array of the sensor (here: an array of 224×288). The angle indication 110 can be defined as the angle of an intrinsic feature of the minutiae or of its surrounding line structure in relation to a predefined 0 degree angle of the array of the sensor.

Then a first minutiae vector 102 of the query template (within the example numbered 6) is selected.

A sector distribution based on the position and angle 110 of the first minutiae vector 102 is defined. This may be a simple square area distribution (not shown in the drawings), e.g. with a side length of 20 pixels with the position of the first minutiae vector at relative position (0,0), wherein the squares are oriented along said angle indication 110.

Another simple sector distribution is shown in FIG. 1. This is a target 101 constructed around a minutiae point 102, which is per definition located in the "bull's eye" at the relative coordinates (0,0). The distribution is defined by concentric circles 103 around said point 102 and radial lines 104 starting from the relative position of the first minutiae vector 102, i.e. (0,0). Within the embodiment shown in FIG. 1 there are 16 sectors zones 104 having an angular opening of 22,5 degree and the concentric circles have a radius of 20 pixels. Within other embodiments (not shown) the radius may start with e.g. 10, 20 or 30 pixels and increase or decrease in a monotone way. In FIG. 1 every sector 105 has the same relative radius of 20 pixels. Therefore the distribution of FIG. 1 provides 160 different sectors 105. The X-Y coordinates in relation to the sensor image shown as rectangle 119 are shown with the lines 120 and 121. The numbering of the pixels starts in corner 122. Ring sectors 109 outside the rectangle 119 relate to sectors which are marked "non valid", i.e. the value of the validity vector of said sectors is 0 and therefore only such sectors are used in the scalar product being part of the query image 119 as well as part of the template image.

Now the number of further minutiae vectors in any sector 105 of the sector distribution is determined. Some sectors 106 are empty (null minutiae) and sectors 107 have received one further minutiae vector (numbered 0 and 1 and 3). Sectors 108 have couples of two further minutiae vectors (numbered 11 and 13; 15 and 18; 27 and 29). In other words, each ring sector 105, 106, 107, 108 is considered a bin, and all neighbor minutiae are binned into their ring sectors.

The minutiae shown in FIG. 1 are only those having a minimum reliability, e.g. of 0.2 on a scale between 0 and 1.

The target having r=10 rings and s=16 sectors zones corresponds to an r times s dimensional feature vector containing the hits. In case of a square distribution this corresponds to r rows and s lines. This vector called P is the vector of the chosen minutiae (here numbered 6). It is assumed that this vector is robust against translation, rotation, distortion or incompleteness of the fingerprint image.

Ring sectors 109, being outside of the image borders 119, are marked invalid.

Instead of matching the minutiae pattern directly, the local environments, characterized by the sector distribution are matched.

The query set with m minutiae (m=29 in FIG. 1) produces a feature vector $Pq_k$ (k=1 to m). In the same way the stored template set with n minutiae produces a feature vector $Pt_i$ (i=1 to n).

Preferably each feature vector is accompanied by a validity vector $Pvt_i$ and $Pvq_k$, respectively, with the components being equal to 1, if the sector element (e.g. 106, 107, 108) is inside the image borders 119, or being equal to 0, if the sector element (e.g. 109) is outside the image borders 119. Such validity vectors are used to mask invalid elements of the feature vectors in the matching process.

Furthermore the reliability of the minutiae is used. Usually all minutiae with a reliability of less than 20% are discarded, i.e. the respective feature vector P is set to 0. The reliability can be read out from the mindtct-Routine of the NFIS/NIST software.

The matching process consists in calculating the normalized (and validity masked) scalar product for every combination of $Pt_i$ and $Pq_k$. This results in a match matrix M.

For any given minutia v in the query minutia set, the corresponding minutia u in the template set is found by searching the maximum element in column v of M.

In order to reject unwanted false matches at an early stage the maximum element has to be larger than a threshold value t1 and the second runner has to be smaller than a second threshold value t2 times the maximum element in the row. Typical values are t1=0.5 and t2=0.8. If this condition is met a matching pair is found: minutia v of the query set can be matched with minutia u of the template set where u is the index of the maximum element in column v.

All other elements in column v of M are subsequently set to zero and the resulting matrix can then be used as a look up table for the mated minutiae pairs using array sort and index functions.

Then, a consistency check is performed according to all of the following criteria:
- the matching pair must be of the same minutia type (either bifurcation—bifurcation or ridge—ridge),
- the relative minutia orientation in the result set must be the same in the template as in the query, and
- the computed scalar product of the vectors leading from mated minutiae to its mated list neighbors must be within some tolerance limits in the template and in the query.

Pairs that do not comply with these criteria are kicked out of the set.

The topological matcher therefore returns a set of mated minutiae pairs (template/query). Their respective pixel coordinates are easily looked up with the output generated by the feature extraction process.

The geometrical matcher uses the image coordinates of the minutiae of the result set of the topological matcher to register the query image, the input image, to the template image, the base image. In other words, the query image is transformed into the same frame of reference as the template image.

The topological matcher has provided sets of mated minutiae in order to compute the image transformation parameters of the image registration process. The transformation will compensate for distortion within the convex hull of already mated minutiae. The following transformation types are used: "linear conformal" with at least two pairs of mated minutiae, wherein straight lines remain straight and parallel lines are still parallel; "affine" with at least three pairs of mated minutiae, wherein straight lines remain straight and parallel lines are still parallel, but rectangles become parallelograms; and "projective" with at least four pairs of mated minutiae, wherein straight lines remain straight but parallel lines converge towards vanishing points which may or may not be within the image. Such transformation functions can e.g. be realized with the Software packet Matlab and the function cp2tform. Said transformation function cp2tform finds the transformation coefficients exactly, if the number of control points is the minimum number. If there are additional points, than a least squares solution is found.

The transformed image is compared with the template image. For every query minutiae it is determined, if the closest template minutiae is within a certain pixel distance tolerance. With the use of a 288×244 pixel sensor with the embodiment of the invention a distance tolerance between 1 to 7 pixels, preferably 3 to 5 pixels is used. This represents a tolerated deviation (threshold) between 0,3% and 3%, preferably between 1% and 2%.

After finding a candidate match and the above mentioned distance tolerance check, a number of consistency checks is performed:
- comparison of the minutiae type (e.g. ridge ending or bifurcation),
- comparison of the minutiae direction,
- evaluation of sufficient reliability of the matching template (e.g. >20%), and
- evaluation of sufficient reliability of the query template, e.g. evaluation of the quality of the minutiae used for the registration process (e.g. >20%).

If a candidate match passes all these checks, it will be added to the result set. The geometrical matching is an iterative process, repeated until no additional mated minutiae pairs can be found.

Further sector distributions may comprise a hexagonal grid or rectangular sectors, etc.

Figure 2:
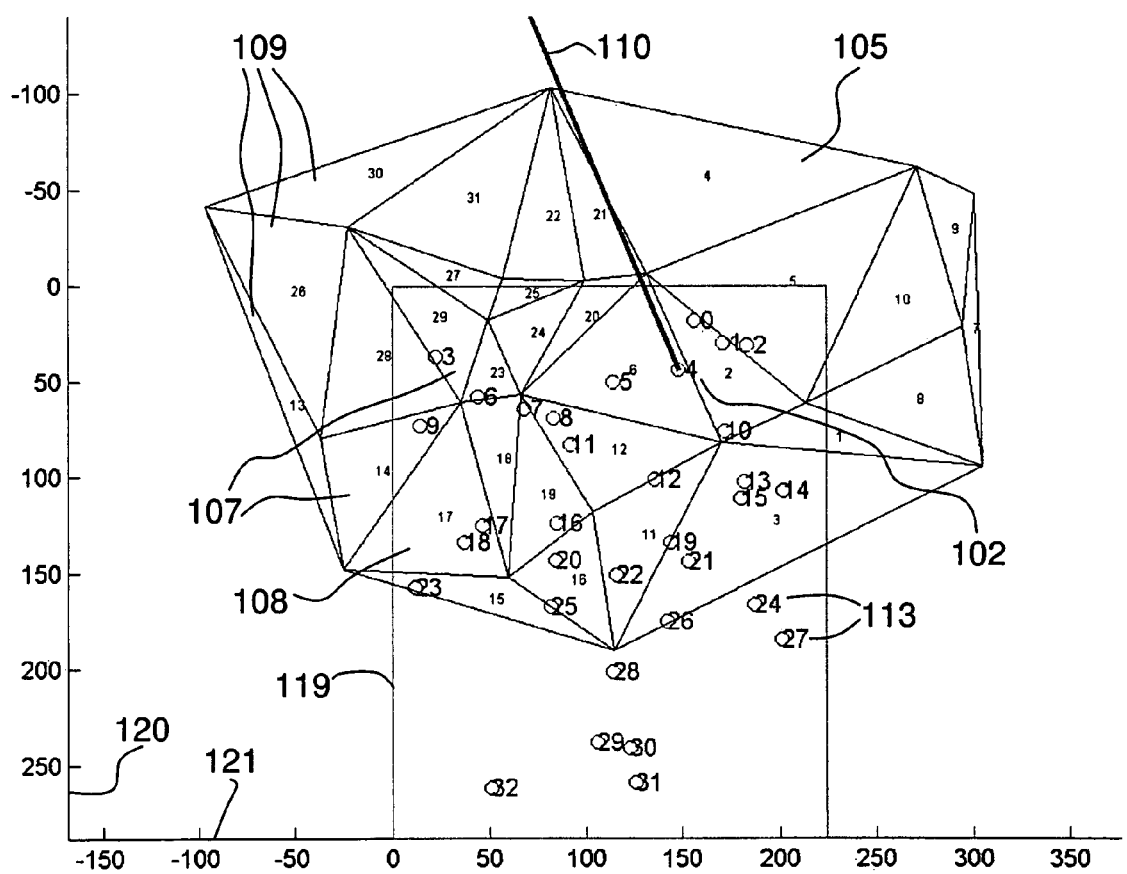
FIG. 2 shows a target constructed around a minutiae point according to a second embodiment of the invention.

FIG. 2 shows a target constructed around a minutiae point according to a second embodiment of the invention. Same features receive the same reference numerals throughout all figures. Within FIG. 2 31 minutiae are shown wherein minutia with the number 4 is the chosen minutia with its intrinsic direction 110. The same principles apply to retrieve the minutiae pairs. It has to be noted that of course identical targets are to be used for template and query analysis.

Furthermore it can be seen from FIG. 2 that there may be minutiae 113 which are not inside one of the sectors 105. They are simply discarded.

The general principle of operation for the embodiment shown in FIGS. 1 and 2 is based on identical topological structures defined around each minutia which is mapped on an algebraic structure. The algebraic structures can be compared in such a way that identical or very similar topologic structures around minutiae can be detected.

The efficiency of the method and device can even be improved, if a method and device for the detection of gummy fingers is used.

The detection of gummy fingers is a method step, which can be used in a stand-alone realization for any fingerprint matching method and apparatus; or, the method can readily be used with the fingerprint matching method mentioned above as additional step.

Figure 3:
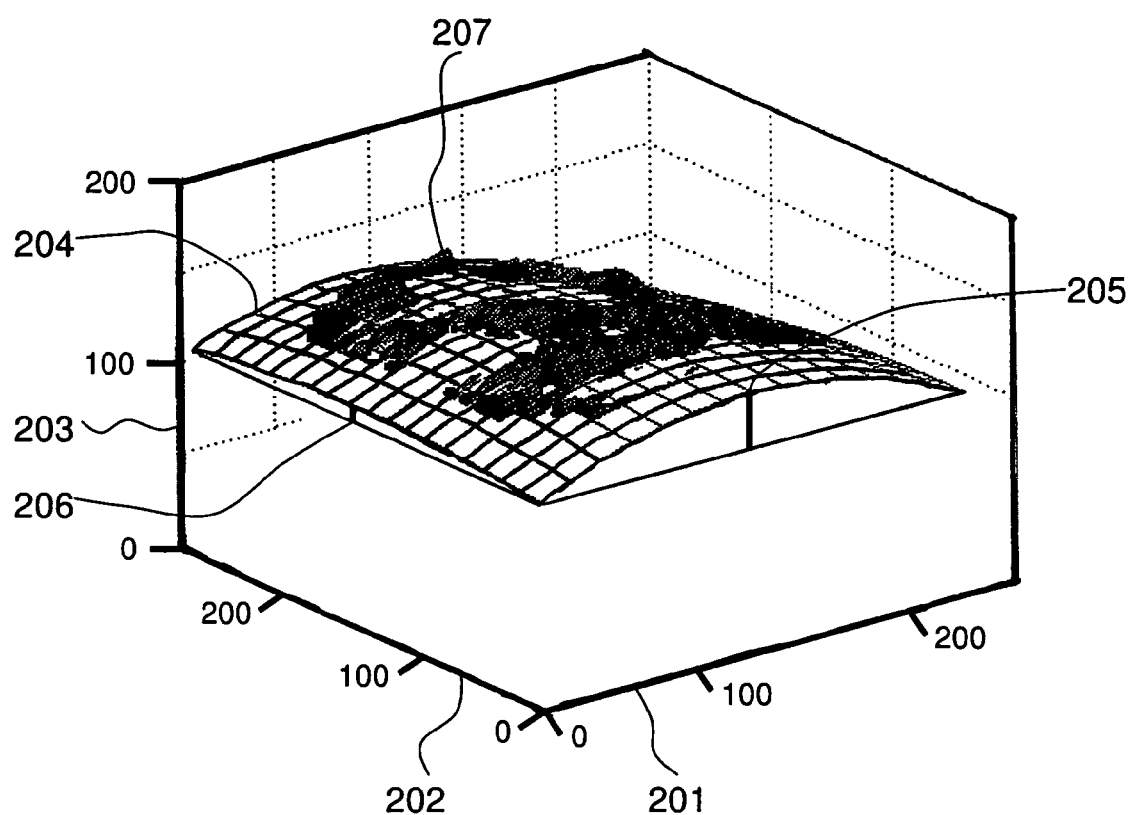
FIG. 3 shows a diagram of the overall gray level image produced by a gummy finger detected according to another embodiment of the invention.

FIG. 3 shows a diagram of the overall gray level image produced by a gummy finger detected according to another embodiment of the invention. The X- and Y-axis 201 and 202 relates to the absolute coordinates of the pixels of the image provided by the sensor. The Z-axis 203 relates to the relative gray value of the pixels. A second order surface fit 204 was used to compute the principal curvatures of the surface fitted to the BMP gray levels. It is clear that it is possible to apply this method for any graphic image file comprising the fingerprint grayscale values, e.g. TIF images, GIF images or compressed formats as JPEG or PNG. Beside the template and query image coordinates of the mated minutiae (incl. their total number) the principal curvatures of the fitted surface to the image gray levels are provided.

The gray level distribution was low pass filtered, e.g. with a MATLAB sliding neighbourhood filter with a block size of 20×20 pixel and subsequently a second order surface was fitted to the filtered image data. Said second level surface is almost flat, i.e. the principal curvatures are almost zero for fingerprint scans of genuine fingers. Typical values for the curvatures of genuine fingers are 0.0001 to 0.0002.

The second order surface 204 shows the fitted surface. The darker areas 207 show the low pass filtered gray level distribution of the scan. Only gray level of those areas are taken into account, which can be brought into congruence and having a sufficient quality in the template as well as in the query, a value which can be generated with the mindtct routine of said NFIS/NIST package.

However, as it can be seen from FIG. 3 by comparison of the curvature of query and template, that, in case a fingerprint provided by a gummy finger was used, a negative curvature of the gray level distribution as compared to their live, genuine counterparts was experienced. Typical values for the curvatures of false fingers are −0.0001 to −0.0030.

In direction of the X-axis 201 the gray value is in the middle of the sensed surface by a difference 205 greater than at the borders. This can also be experienced in direction of the Y-axis 202, since the gray value is in the middle of the sensed surface by a difference 206 greater than at the borders.

This effect can be used to discard queries presented through the use of gummy fingers. It is possible to rely on one of the two difference values or to require the existence of both negative curvatures to make the decision relating to the genuineness of the presented finger.

The method makes use of the following function:

$$z = b_1 + b_2 x + b_4 x^2 + b_5 y^2 + b_6 xy$$

wherein x and y are the free coordinates and z represents the gray level. The principal curvatures $k_1$ and $k_2$ can be calculated as the roots k of $$\begin{vmatrix} b_4 - k & b_6/2 \\ b_6/2 & b_5 - k \end{vmatrix} = 0$$

The decision to issue a gummy finger warning is given, if the principal curvatures $k_1$ and $k_2$ of the query image are substantially negative, especially after comparison with the related principal curvatures $k_1$ and $k_2$ of the genuine counterpart. This method is based on the insight that the raw image of a gummy finder is darker at the edges and brighter in the center. This is due to the fact that a gummy finger has to be pressed against the sensor with uneven forces to compensate for curvature of the elastic material of the artificial finger.

Preferably the regression is only calculated on those parts of the template and query images that are contained in both images and whose region exceeds a certain quality threshold. Nevertheless, it is possible to compute raw image data without use of the template data. In such a case the threshold of the curvatures can be chosen $k_1 = k_2 = 0$.

The invention claimed is:

1. A method to conduct fingerprint verification, comprising:
   a) providing a first template having a first minutiae set of m minutiae and a second template having a second minutiae set of n minutiae, wherein each minutiae vector m or n comprises a position indication and an angle indication,
   b) selecting a minutiae vector i of one template k,
   c) providing a sector distribution based on the position and angle of the minutiae vector i,
   d) determining the number of further minutiae vectors of the template k in any sector of the sector distribution,
   e) generating an algebraic structure representing the topology of the neighbourhood of the minutia vector i of the template k,
   f) performing steps b) to e) for every minutiae vector i of both templates k (k=1, 2) to create two feature algebraic structures,
   g) matching the two feature algebraic structures by an operation measuring similarity of the underlying topology resulting in a match matrix M, and
   h) determining mated pairs of minutiae from the first and minutiae from the second template by searching maximum elements of M,
   to issue a value representing an identification information of the fingerprint.

2. The method according to claim 1, wherein the generation of an algebraic structure within step e) comprises:
   e) generating a feature vector Pki for the minutiae vector i of the template k, wherein the generation of the feature algebraic structures within step f) comprises:
   f) performing steps b) to e) for every minutiae vector i of both templates k (k=1, 2) to create the feature arrays P1i and P2j (i=1, . . . , m; j=1, . . . , n),
   wherein the operation measuring similarity for matching of the feature algebraic structures within step g) comprises:

g) matching the two feature arrays by calculating the scalar product for every combination of P1i and P2j (i=1, ..., m; j=1, ..., n) resulting in a match matrix M, and wherein the determination of mated pairs within step h) comprises:

h) determining mated pairs of minutiae v from the first and minutiae u from the second template by searching the maximum element (=u) in column v of M.

3. The method according to claim 1, wherein the matrix M is normalized, validity masked, and/or reliability masked before the scalar product is calculated.

4. The method according to claim 2, wherein the matrix M is at least one of normalized, validity masked, and reliability masked before the scalar product is calculated.

5. The method according to claim 3, wherein in step h) a mated pair is only accepted, if said maximum element is larger than a first threshold value t1 and if the second runner is smaller than a second threshold value t2, wherein t1 equals 0.5 and t2 equals 0.8.

6. The method according to claim 1, wherein a look up table is created by setting all not selected elements beside the maximum element u in every column v of M to zero after step h).

7. The method according to claim 2, wherein a consistency check for every matching pair is performed after step h) comprising one or more of the following comparisons:
the matching pair must be of the same minutia type,
the relative minutia orientation in the result set must be the same in the template as in the query, or
the computed scalar product of the vectors leading from a mated minutia to its mated list neighbours must be within some tolerance limits in the template and in the query.

8. The method according to claim 2, wherein a geometrical transformation step is conducted to compensate for distortion within a convex hull of already mated minutiae to enable image registration.

9. The method according to claim 8, wherein the image data is low pass filtered before either mated pairs of minutiae or curvature values are compared between a first and second template for regions that are contained in both the first and second templates.

10. A computer readable medium having stored therein at least one sequence of instructions configured to cause a microprocessor to perform acts to conduct a fingerprint verification, the acts comprising the steps of:

a) providing a first template having a first minutiae set of m minutiae and a second template having a second minutiae set of n minutiae, wherein each minutiae vector m or n comprises a position indication and an angle indication, b) selecting a minutiae vector i of one template k, c) providing a sector distribution based on the position and angle of the minutiae vector i, d) determining the number of further minutiae vectors of the template k in any sector of the sector distribution, e) generating an algebraic structure representing the topology of the neighbourhood of the minutia vector i of the template k, f) performing steps b) to e) for every minutiae vector i of both templates k (k=1, 2) to create two feature algebraic structures, g) matching the two feature algebraic structures by an operation measuring similarity of the underlying topology resulting in a match matrix M, and h) determining mated pairs of minutiae from the first and minutiae from the second template by searching maximum elements of M, to issue a value representing an identification information of the fingerprint.

11. The computer readable medium of claim 10 further configured to perform the acts comprising the steps of:

e) generating a feature vector Pki for the minutiae vector i of the template k, wherein the generation of the feature algebraic structures within step f) comprises:

f) performing steps b) to e) for every minutiae vector i of both templates k (k=1, 2) to create the feature arrays P1i and P2j (i=1, ..., m; j=1, ..., n), wherein the operation measuring similarity for matching of the feature algebraic structures within step g) comprises:

g) matching the two feature arrays by calculating the scalar product for every combination of P1i and P2j (i=1, ..., m; j=1, ..., n) resulting in a match matrix M, and wherein the determination of mated pairs within step h) comprises:

h) determining mated pairs of minutiae v from the first and minutiae u from the second template by searching the maximum element (=u) in column v of M.

12. A fingerprint verification system, comprising a fingerprint sensor and a microprocessor, the fingerprint sensor configured to perform fingerprint scanning and to transmit scanning information to said microprocessor, the microprocessor comprising means to generate vectors of fingerprint minutiae by fingerprint minutiae extraction, and the microprocessor further comprising means to execute the steps of:

a) providing a first template having a first minutiae set of m minutiae and a second template having a second minutiae set of n minutiae, wherein each minutiae vector m or n comprises a position indication and an angle indication, b) selecting a minutiae vector i of one template k, c) providing a sector distribution based on the position and angle of the minutiae vector i, d) determining the number of further minutiae vectors of the template k in any sector of the sector distribution, e) generating an algebraic structure representing the topology of the neighbourhood of the minutia vector i of the template k, f) performing steps b) to e) for every minutiae vector i of both templates k (k=1, 2) to create two feature algebraic structures, g) matching the two feature algebraic structures by an operation measuring similarity of the underlying topology resulting in a match matrix M, and h) determining mated pairs of minutiae from the first and minutiae from the second template by searching maximum elements of M, to issue a value representing an identification information of the fingerprint.

13. The fingerprint verification system of claim 12, wherein the microprocessor further comprises means to execute the steps of:

e) generating a feature vector Pki for the minutiae vector i of the template k, wherein the generation of the feature algebraic structures within step f) comprises:

f) performing steps b) to e) for every minutiae vector i of both templates k (k=1, 2) to create the feature arrays P1i and P2j (i=1, ..., m; j=1, ..., n), wherein the operation measuring similarity for matching of the feature algebraic structures within step g) comprises:

g) matching the two feature arrays by calculating the scalar product for every combination of P1i and P2j (i=1, . . . , m; j=1, . . . , n) resulting in a match matrix M, and wherein the determination of mated pairs within step h) comprises:

h) determining mated pairs of minutiae v from the first and minutiae u from the second template by searching the maximum element (=u) in column v of M.

14. The method according to claim 12, wherein the matrix M is normalized, validity masked, and/or reliability masked before the scalar product is calculated.

15. The method according to claim 13, wherein the matrix M is at least one of normalized, validity masked, and reliability masked before the scalar product is calculated.

16. The method according to claim 14, wherein in step h) a mated pair is only accepted, if said maximum element is larger than a first threshold value t1 and if the second runner is smaller than a second threshold value t2, wherein t1 equals 0.5 and t2 equals 0.8.

17. The method according to claim 13, wherein a look up table is created by setting all not selected elements beside the maximum element u in every column v of M to zero after step h).

18. The method according to claim 13, wherein a consistency check for every matching pair is performed after step h) comprising one or more of the following comparisons:

the matching pair must be of the same minutia type, the relative minutia orientation in the result set must be the same in the template as in the query, or the computed scalar product of the vectors leading from a mated minutia to its mated list neighbours must be within some tolerance limits in the template and in the query.

19. The method according to claim 13, wherein a geometrical transformation step is conducted to compensate for distortion within a convex hull of already mated minutiae to enable image registration.

* * * * *

UNITED STATES PATENT AND TRADEMARK OFFICE
CERTIFICATE OF CORRECTION

PATENT NO. : 7,206,437 B2
APPLICATION NO. : 10/964358
DATED : April 17, 2007
INVENTOR(S) : Kramer et al.

It is certified that error appears in the above-identified patent and that said Letters Patent is hereby corrected as shown below:

Column 9, Line 21, Claim 6, "according to claim 1" should read -- according to claim 2 --

Signed and Sealed this

Thirtieth Day of October, 2007

JON W. DUDAS
*Director of the United States Patent and Trademark Office*